United States Patent

[11] 3,576,963

[72] Inventor Freeman M. Vowels
Louisville, Ky.
[21] Appl. No. 757,169
[22] Filed Sept. 3, 1968
[45] Patented May 4, 1971
[73] Assignee American Air Filter Company, Inc.
Louisville, Ky.

[54] WELDING METHOD
4 Claims, 1 Drawing Fig.
[52] U.S. Cl. .................................................. 219/92
[51] Int. Cl. ...................................... B23k 11/10
[50] Field of Search .......................................... 219/92–
—94, 106

[56] References Cited
UNITED STATES PATENTS
| | | | |
|---|---|---|---|
| 1,039,135 | 9/1912 | Johnson ....................... | 219/94 |
| 2,452,805 | 11/1948 | Sussenbach ................. | 219/92X |
| 2,902,589 | 9/1950 | Wirta ............................ | 219/92X |
| 3,067,488 | 12/1962 | Bennett et al................ | 219/93X |

Primary Examiner—J. V. Truhe
Assistant Examiner—J. G. Smith
Attorney—Ralph B. Brick

ABSTRACT: A method of resistance welding electrically conductive bodies together wherein projection means and sealing means are positioned between overlapped portions of such bodies, the bodies then being subjected to pressure and current to seal and weld the bodies together.

PATENTED MAY 4 1971
3,576,963
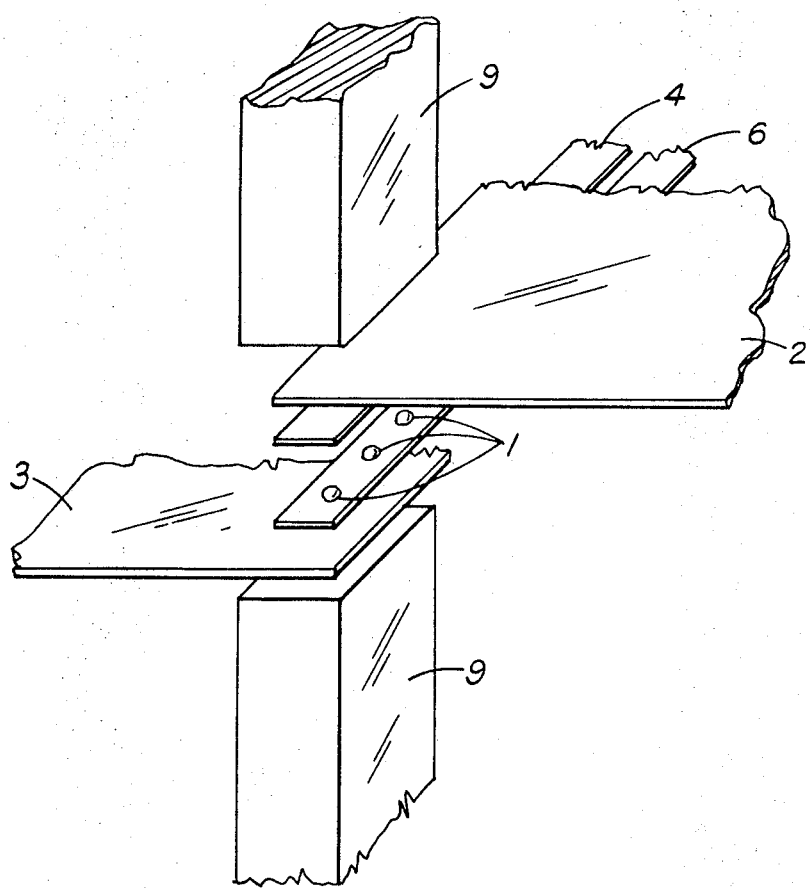
INVENTOR.
Freeman M. Vowels
BY
Ralph C. Brick

WELDING METHOD

BACKGROUND OF THE INVENTION

The present invention relates to a method of resistance welding and more particularly to a method of resistance welding by spot binding lapped metallic sheets.

The present invention recognizes that it has been known in one area of the art of electrically welding metallic parts together to limit the weld to restricted portions or so-called "-spots" by providing embossments on the metallic parts to be welded or by providing separate pellets between the parts so that the current and pressures employed in the welding operations are localized by the formations and the parts welded together at the area enclosing the formations. in addition, the present invention recognizes that it has been known in another area of the art of electrically welding metallic parts together to apply a sealing compound between lapped metal bodies to be spot-welded together so as to effect a tight, permanent seal.

SUMMARY OF THE INVENTION

The present invention, recognizes the significant advantages in each of these several known methods of welding which are from distinct areas of the welding art, combines the various steps of such several methods to provide a new, useful, and unobvious method of welding which is straightforward, economical, and efficient in its execution, permitting both the welding an sealing together of two overlapped metallic bodies in the same process with a minimum of steps, a minimum of effort, and a minimum of materials. In addition, the present invention can be used with metallic bodies of various thickness, avoiding the need for displacement and distortion of the metallic bodies which are to be joined.

Various other features of the present invention will become obvious to one skilled in the art upon reading the disclosures set forth hereinafter.

More particularly, the present invention provides a method of resistance welding electrically conductive metallic bodies together comprising the steps of: positioning in overlapping spaced relationship the inner adjacent surfaces of metallic bodies to be joined; placing strip means of electrically conductive sealing composition between the overlapping inner adjacent surfaces; positioning electrically conductive metallic projection means on the sealing strip means to provide at least one contact resistance point on the strip; moving the inner adjacent surfaces of the metallic bodies into electrically conductive contact with the strip of sealing composition and metallic projection means; causing an electrical current to flow through the contact resistance point to concentrate the heating effect to locally fuse the metallic bodies and melt the sealing strips therearound; and applying pressure to force the molten metal to form a weld and the melted plastic compound to form a seal between the metallic bodies.

It is to be understood that various changes can be made in the several steps of the method described hereinafter without departing from the scope or spirit of the present invention.

Referring to the drawing, FIG. 1 discloses an exploded view showing two plates about to be welded in accordance with one advantageous embodiment of the present invention.

As can be seen in the drawing, metal plates 2 and 3 are shown in spaced overlapped relation. Positioned between these two plates in faced opposed relation are strips of sealing material 4 and 6. The sealing material utilized can be any one of several types known in the art. It is desirable that material be in the plastic stage to support therebetween in firm prepositioned spaced relationship projection pellets 7. Pellets 7 can be ferrous balls, and are carefully selected in size in accordance with the thickness and other geometric parameters of plates 2 and 3. Advantageously, sealing tape such as that sold by Sandon, Inc., P.O. Box 120, 12 Bennett Drive, Granville, N.Y. under the name "Weldseal" can be utilized. This tape is a soft, permanently plastic product, manufactured in a film of fixed thickness and width for application between the members to be welded prior to the welding steps. The tape forms a tight gasket the entire length of the seam and flows out only enough to form a smooth bead along the exposed edges of the seam. Upon cooling, the tape returns to its original plastic characteristic. The uniformity of materials and performance insures the retention or exclusion of moisture. Advantageously, the tape can be provided with a pressure-sensitive adhesive. This adhesive permits a firm positioning of the pellets 7 on the tape and enhances the overall operation. It also is to be understood that other sealing composition tapes can be utilized. For example, sealing tapes such as disclosed in expired U.S. Pat. Nos. 2,452,805 and 2,510,727, issued to P. Sussenbach and assigned to the Presstite Engineering Company, St. Louis, Mo., can be utilized.

In carrying out the operation, pellets 7 are placed in preselected spaced relationship between sealing tapes 4 and 6 so as to be sandwiched therebetween, the adhesive on the sealing tapes insuring that pellets 7 are held in a firm, preselected position. This assembly of tapes and pellets is then placed between overlapping inner adjacent surfaces of metallic bodies 2 and 3 to be welded together. With the various parts held firmly in proper position, welding electrodes 9 are then applied along the seam under the usual pressure. The pressure of electrodes 9 forces the plates toward one another and squeezes tapes 4 and 6 and pellets 7 therebetween. Upon application of pressure and passage of the welding current through the electrodes, the plates, the pellets, and the sealing composition, the plates become welded together at spaced pellets 7 along the seam, pellets 7 melting along with strips 4 and 6 therearound. The applied pressure and the heat generated by the welding current causes the molten metal of pellets 7 to form the weld and the melted plastic compound of strips 4 and 6 the seal between the metallic bodies 2 and 3. Upon cooling, the composition of strips 4 and 6 returns to the plastic condition to seal the seam along its entire length with the welds hardening in the form of spot welds at the points of projection.

I claim:

1. A method of resistance welding two electrically conductive metallic bodies together comprising the steps of: positioning in overlapping spaced relationship the inner adjacent surfaces of said metallic bodies to be joined; placing strip means of electrically conductive sealing composition between said overlapping inner adjacent surfaces; positioning electrically conductive metallic projection means in the form of separate pellets on said sealing strip means to provide at least one contact resistance point on said strip; moving said inner adjacent surfaces of said metallic bodies into electrically conductive contact with said strip of sealing composition and metallic projection means; causing an electrical current to flow through said contact resistance point to concentrate the heating effect to locally and substantially melt said pellets and fuse the metallic bodies and melt the sealing strips therearound; and applying pressure to force the molten metal to form a weld and the melted plastic compound to form a seal between the metallic bodies.

2. The method of claim 1 wherein said electrically conductive metallic pellet projection means is comprised of a plurality of spaced ferrous ball members of a diameter preselected in accordance with the dimension of the metallic bodies to be welded.

3. The method of claim 1 wherein said sealing strip is of thermoplastic material and includes an adhesive for said electrically conductive metallic projection means.

4. The method of claim 1, wherein said strip means comprises a pair of opposed electrically conductive strips, said metallic projection means being positioned between said strip means.